(12) United States Patent
Bagusch et al.

(10) Patent No.: US 10,330,186 B2
(45) Date of Patent: Jun. 25, 2019

(54) POWER SPLIT TRANSMISSION

(71) Applicant: Danfoss Power Solutions GmbH & Co. OHG, Neumünster (DE)

(72) Inventors: Jens Bagusch, Schleswig-Holstein (DE); Torsten Kohmäscher, Hamburg (DE)

(73) Assignee: Danfoss Power Solutions GmbH & Co. OHG, Neumunster (DE)

( * ) Notice: Subject to any disclaimer, the term of this patent is extended or adjusted under 35 U.S.C. 154(b) by 0 days.

(21) Appl. No.: 15/476,210

(22) Filed: Mar. 31, 2017

(65) Prior Publication Data

US 2017/0292595 A1 Oct. 12, 2017

(30) Foreign Application Priority Data

Apr. 8, 2016 (DE) .......................... 10 2016 205 933

(51) Int. Cl.
*F16H 47/04* (2006.01)
*F16H 3/72* (2006.01)
*F16H 37/08* (2006.01)
*F16H 37/10* (2006.01)

(52) U.S. Cl.
CPC .................... *F16H 47/04* (2013.01)

(58) Field of Classification Search
CPC .... F16H 47/04; F16H 3/72; F16H 2037/0873; F16H 2037/088; F16H 2037/106
See application file for complete search history.

(56) References Cited

U.S. PATENT DOCUMENTS

| 3,988,949 | A | * | 11/1976 | Weseloh | ................... | F16H 3/72 |
| | | | | | | 475/217 |
| 8,469,850 | B2 | | 6/2013 | Stoeckl et al. | | |
| 9,746,060 | B2 | * | 8/2017 | Hawkins, Jr. | ......... | F16H 37/086 |
| | | | | (Continued) | | |

FOREIGN PATENT DOCUMENTS

| CN | 103867686 A | 6/2014 |
| DE | 10 2004 021 071 A1 | 12/2004 |
| | (Continued) | |

OTHER PUBLICATIONS

Chinese Office Action with English Translation for Serial No. 201710223914.8 dated Dec. 3, 2018.

*Primary Examiner* — Jacob S. Scott
*Assistant Examiner* — Tinh T Dang
(74) *Attorney, Agent, or Firm* — McCormick, Paulding & Huber LLP (57) ABSTRACT

A power split transmission and a method of merging the power flows of the power split transmission are provided. A power input shaft drives a planetary gear set splitting the input power into a power flow over a variable power branch and into a power flow over a mechanical power branch. The power flows can be merged for driving a power take-off shaft. A reverser includes a first clutch, a second clutch, a first gear set and a second gear set. By engaging the first clutch and disengaging the second clutch the first gear set is driven, if an output shaft of the variable power branch and a mechanical transmission shaft are counter-rotating. By engaging the second clutch and the first clutch disengaging the second gear set is driven, if the output shaft of the variable power branch and the mechanical transmission shaft are co-rotating.

20 Claims, 5 Drawing Sheets

(56) References Cited

U.S. PATENT DOCUMENTS

2008/0103006 A1* 5/2008 Pollman .................. F16H 47/04
                                                          475/72
2010/0062889 A1* 3/2010 Lindsay .................. F16H 47/04
                                                          475/73
2016/0230863 A1* 8/2016 Dyck ................... F16H 37/084

FOREIGN PATENT DOCUMENTS

| DE | 10 2010 036 817 A1 | 3/2011 |
| DE | 10 2014 105 291 A1 | 10/2015 |
| DE | 102016200752 A1 | 7/2017 |
| EP | 2606259 B1 | 6/2014 |
| EP | 2932135 A1 | 10/2015 |
| WO | 2008019799 A2 | 2/2008 |
| WO | 2014095317 A1 | 6/2014 |

* cited by examiner

POWER SPLIT TRANSMISSION

CROSS-REFERENCE TO RELATED APPLICATION

This application claims foreign priority benefits under U.S.C. § 119 to German Patent Application No. DE102016205933.5 filed on Apr. 8, 2016, the content of which is hereby incorporated by reference in its entirety.

TECHNICAL FIELD

The present invention is directed to a power split transmission, comprising a power input shaft for driving a planetary gear set splitting the input power at the power input shaft into a power flow over a variable power branch having a variable transmission ratio, and into a powerflow over a mechanical power branch having a fixed transmission ratio, whereas the powerflows transmitted over the variable power branch and the mechanical power branch can be merged again to drive a common power take-off shaft. The invention is also directed to a method of merging the power flows of a power split transmission.

BACKGROUND

In a machine, such as a wheel loader or a tractor, for example, an internal combustion engine supplies power for propelling the machine in the forward or reverse direction and supplies power for further machine implements as well. A transmission is coupled to the engine via a power input shaft and transmits power from the engine to the drivetrain via a power take-off shaft to propel the machine. For this purpose, in practice, diverse types of hydro-mechanical transmissions combining mechanical and hydraulic components are used. Particular types of such transmissions are power split transmissions. Normally, power split transmissions have two distinct branches for power transmission: a mechanical branch and a variable transmissions ratio branch, e.g. a hydrostatic branch comprising a hydrostatic pump connected to a hydrostatic motor or e.g. a CVT (Continuously Variable Transmission) gear set. The power in a hydrostatic branch is usually controlled by the displacement of the hydrostatic pump and/or the hydrostatic motor. In contrast, the power in the mechanical branch is often constant or selectable in fixed steps by means of gear sets and clutches though the power in the mechanical branch varies with the speed of the output shaft of the drive engine. The powers of both branches can be merged again for instance by summation gearboxes, thus allowing a precise control of the machine speed and machine torque. Such transmissions usually permit a forward as well as a reverse motion of the machine.

A simple and reliable exemplary embodiment of such an arrangement is known from the state of the art, exemplarily used in tractors of AGCO Fendt. This embodiment is shown simplified in FIG. 1. The power split transmission of the state of the art comprise a power input shaft for driving a planetary gear set splitting the input power at the power input shaft into a power flow over a hydrostatic power branch driven by the ring gear of the planetary gear set, and into a powerflow over a mechanical power branch connecting the sun gear directly with the power take-off shaft. The powerflow transmitted over the hydrostatic power branch is merged again to the mechanical power branch by a summation gear box having a fixed transmission ratio for driving the power take-off shaft arranged as an extension of the mechanical power branch.

This type of construction of a power split transmission has the drawback that in a reverse driving mode of the machine, hydraulic power is recirculated via the mechanical branch to the planetary gear set. For driving in the reverse direction the rotational direction of the output shaft of the hydrostatic power branch is reversed by swivelling the hydraulic pump to the correspondent other side for instance, thereby changing the rotational direction of the hydraulic motor and the rotational direction of the output shaft of the hydrostatic power branch and thereby forcing the mechanical power branch and the sun gear to rotate in the reverse direction. As the planet carrier is driven by a combustion engine and always turns in the same direction, a forced driving of the sun gear in the reverse direction constitutes power losses. At the same time, a counter-rotated sun gear forces the ring gear to high or even very high revolutions which leads in reverse driving direction to higher speeds in the pump unit and higher flows in the hydrostatic transmission which could result in higher losses in the variable power branch. The increased speed of the pump unit in a reverse driving direction needs to be considered during the design phase of the power split transmission and results in larger hydrostatic pump units. Higher speeds in the pump unit also cause high inertial forces in the hydrostatic pump, especially if the resulting pump-design has to be larger due to the recirculated power. Furthermore, high inertial forces can cause high wear and/or damage in the used drive units of the variable power branch.

SUMMARY

It is an object of the present invention to provide an improved principle of power split transmission that obviates the problems present in the state of the art and that improves the efficiency level for the operation of a machine drive system with a power split transmission. Another object of the invention is to provide a method for merging the power flows of a power split transmission that permits an efficient operation of the power split transmission in forward drive operation and in reverse drive operation.

To that end a power split transmission of the above mentioned kind is, according to the present invention, characterized in that a reverser is applied as a summation gear box for merging the power flows over the variable power branch and the mechanical power branch and in order to drive the power take-off shaft. For this purpose, the reverser comprises a first clutch capable to couple and decouple a first gear set, and further comprises a second clutch capable to couple and decouple a second gear set. The first gear set and the second gear set show opposite signs of transmission ratio, wherein the first gear set shows a negative transmission ratio and the second gear set shows a positive transmission ratio. With this configuration, if an output shaft of the variable power branch counter-rotates with respect to a mechanical transmission of the mechanical power branch, the power flows over variable power branch and the power flow over the mechanical power branch can be merged by engaging the first clutch and disengaging the second clutch. Vice versa, if the output shaft of the variable power branch co-rotates with respect to the mechanical transmission of the mechanical power branch, the power flows can be merged by disengaging the first clutch and engaging the second clutch.

The second object of the invention is solved by the method of merging the power flows of a power split transmission, whereas a power input shaft drives a planetary gear set splitting the input power into a power flow over a variable power branch and into a powerflow over a mechanical power branch, wherein the power flow transmitted over the variable power branch can be merged again with the power flow over the mechanical power branch for driving a power take-off shaft, wherein a reverser used as summation gear comprises a first clutch, a second clutch, a first gear set and a second gear set for merging the power flows and for driving the power take-off shaft, wherein the first gear set has a negative transmission ratio and the second gear set has a positive transmission ratio. According to the invention, the reverser is configured to operate as follows:

Closing the first clutch and opening the second clutch, if the output shaft of the first, variable power branch and the mechanical transmission shaft of the mechanical power branch are counterrotating; or, opening the first clutch and closing the second clutch, if the output shaft of the variable power branch and the mechanical transmission shaft are co-rotating.

By applying and operating the reverser in one embodiment according to the invention it is possible to eliminate the need for a transmission capable to change the rotational direction of the output shaft of the variable power branch. The reverser has two input shafts whose direction of rotation can be set independently from each other, one for the variable power branch and the other one for the mechanical power branch. The two input power flows are merged by the reverser either by means of the first gear set or the second gear set in order to drive the power take-off shaft, i.e. the output shaft of the reverser, in the desired direction. As the two gear sets show opposite signs of transmission ratio the first gear set can be coupled to the power take-off shaft by closing the first clutch; the second gear set can be coupled to the power take-off shaft by closing the second clutch, wherein the corresponding other clutch is opened. Thus, for instance, hydraulic units with positive and negative (crosscentre) swivelling direction as well as hydraulic units with only one swivelling direction or CVTs (Continuous Variable Transmission) can be employed in the variable power branch. In a preferred embodiment high efficient hydrostatic units of the bent axis type are used in the variable power branch. Needless to say that within the scope of the invention hydrostatic units of any type can be used, e.g. of the swash plate type or of the radial piston construction type as well.

By applying the inventive concept, variable transmissions of reduced nominal performance are usable in the variable power branch as no power from the variable power branch is recirculated via the mechanical power branch to the planetary power split gear. Here a reduction in nominal performance of about 30% or even more can be achieved depending on the type of variable transmission. By applying reduced nominal performances for the devices of the variable transmission branch the construction space for the inventive power split transmission is reduced compared to one of power split transmissions known from the state of the art, as hydrostatic units with reduced size can be employed.

By carrying out the inventive method and implementing the inventive concept for a power split transmission the power take-off shaft can be arranged either directly connected to the output shaft of the variable power branch which is considered as a first option or directly connected to the mechanical transmission shaft which is considered as second option. If the power take-off shaft is connected directly to the output shaft of the variable transmission branch (first option) the power flowing over the variable power branch is then in the forward and the reverse driving operation directly transmitted to the power take-off shaft. No recirculation of hydraulic power over the mechanical branch occurs. However, in this case the variable transmission branch has to be capable to change the direction of rotation of its output shaft for providing both rotational directions at the power take-off shaft. So in this embodiment the rotational direction of the mechanical transmission shaft can be kept positive in the forward driving mode and in the reverse driving mode. Hence power re-circulation is prevented by using the reverser according to the invention. By using a reverser the rotational directions of both power branches can be synchronised.

In the other case (second option), if the power take-off shaft is connected to the mechanical transmission shaft, i.e. to the sun gear, the change of rotational direction of the power take-off shaft can be done solely by alternatively engaging one of the two gear sets of the reverser and, at the same time, disengaging the other gear set of the reverser. However, in this embodiment, in the reverse driving mode there is a recirculation of power from the variable power branch over the mechanical power branch to the sun gear. However, there is no need to provide hydrostatic units capable for changing the rotational direction in the variable power branch. Thus, a simpler (uni-directional) and smaller variable transmission system can be used. For instance, when applying a variable hydrostatic transmission in the variable power branch the hydraulic pump must not be capable to be swivelled in positive and negative directions. A hydraulic pump showing only a positive or only a negative range of displacement is sufficient in implementation of the inventive idea. The forward and reverse driving mode of the power take-off shaft is obtained by closing the first clutch and opening the second clutch or vice versa, thereby merging the two power branches over the first or the second gear set having opposed transmission ratios.

Hence, for both power take-off shaft allocation possibilities the variable transmission devices can be of a smaller nominal size, i.e. of lower nominal performance and smaller installation size as the hydraulic units used in the state of the art. This does not only save construction space, it also enables the implementation of smaller and cheaper variable transmission components. In operation of an inventive power split transmission in a working machine the fuel consumption of the combustion engine, e.g. a tractor, can be lowered, as either recirculation of power or the possibility for changing the rotational direction in the variable power branch is avoided.

In application of the inventive concept of a power split transmission a jaw clutch, a synchronized jaw clutch or a friction clutch may be used for the first clutch as well as for the second clutch. Also any other kinds of clutches known in the state of the art are encompassed by the inventive idea.

In a preferred embodiment the drive motor of a machine, for instance a combustion engine, is coupled to the planet wheel carrier of the planetary gear set splitting off the power at the input shaft to be forwarded to a variable transmission branch and to a mechanical transmission branch. Thereby, the variable power branch is drivable via the ring gear, and the mechanical power branch is drivable by the sun gear. Further preferably the mechanical power branch consists solely of a mechanical transmission shaft connecting the sun gear with the summation gear box, here the reverser. Needless to say that in the mechanical power branch manually or automatic operated shift gear boxes can be implemented in order to achieve different transmission ratios between the sun gear and the corresponding reverser input shaft. With this embodiment a simple and therefore a highly reliable power split transmission is achieved, which overcomes the disadvantages of the state of the art.

In another embodiment hydrostatic units are used in the variable transmission power branch wherein closed circuit hydrostatic units are further preferred. For this configuration, hydrostatic units of the axial piston type or the radial piston type are likewise applicable as hydrostatic pumps and motors, for instance of the swash plate or the bent axis type. Also a combination of axial and radial piston type units can be used with the inventive concept. In implementation of the invention there are no limitations for using different types of hydrostatic units as long as the transmission over the variable transmission path can be set variably and at least in one rotational direction.

Naturally, for the first gear set having a negative transmission ratio and for the second gear set having a positive transmission ratio all common known gear sets or gear boxes can be used. Within the scope of the inventive idea also gear sets with different transmission ratios, for instance for providing a plurality of speeds in the forward or reverse mode can be used. The same applies to the connection of the power take-off shaft to a gear box or directly or indirectly to a drivetrain of the vehicle.

BRIEF DESCRIPTION OF THE DRAWINGS

The following exemplary embodiments of the invention described in more detail with reference to the appended drawings do not limit the scope of the inventive idea. All features of the disclosed and illustrated embodiments may be combined in any desired combination with one another within the scope of the invention. It is shown in.

DETAILED DESCRIPTION

Figure 1:
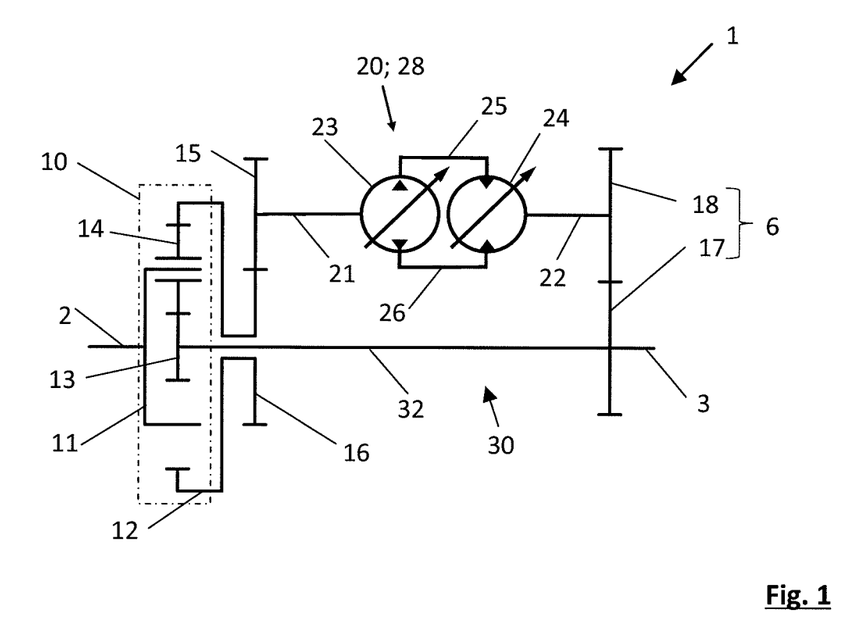
FIG. 1 shows schematically a prior art power split transmission according to the state of the art.

FIG. 1 shows a power split transmission 1 according to the state of the art, as implemented for example in tractors of AGCO Fendt. The power split transmission 1 features on the input side, a power input shaft 2 that can be connected to a unidirectional turning power source, e.g. a combustion engine, not shown. On the other side of the power split transmission 1, the output side, a power take-off shaft 3 serves as a connection to a load, e.g. a drivetrain. A planetary gear set 10 is driven by power input shaft 2 and directly connected to planet carrier 11 of planetary gear set 10 the planet gears 14 of planet carrier 11 mesh with sun gear 13 and with ring gear 12. These features and the general functioning of a planet gear set are well known, such that further detailed description thereof can be omitted here.

As shown in FIG. 1, ring gear 12 is connected to a gear wheel 16 that meshes with another gear wheel 15 forming a first output component. This output component drives an input shaft 21 of a hydrostatic transmission 28, consisting of a hydrostatic pump 23 in communication with a hydrostatic motor 24 by means of two working lines 25 and 26, one of which is a high pressure line and the other one a low pressure line. Both, hydrostatic pump 23 and hydrostatic motor 24 are of the variable displacement type and can be operated in both rotational directions, wherein at least the hydraulic pump 23 can be swivelled in positive as well as in negative direction. Output shaft 22 of the hydrostatic transmission 28 drives a gear wheel 18 that forms part of a gear set 6 at the output side of power split transmission 1. Gear wheel 18 meshes with a gear wheel 17 arranged on a mechanical transmission shaft 32, which connects sun gear 13 with a power take-off shaft 3. Hence, gear set 6 merges the power flows over shafts 22 and 32 to drive power take-off shaft 3. This arrangement forms a power split transmission 1 having a variable transmission ratio deter-mined by the setting of hydrostatic transmission 28. As the gear set 6 shows a negative transmission ratio, i.e. gear wheels 17 and 18 counter-rotate, output shaft 22 of the variable transmission 20 has to counter-rotate with respect to mechanical transmission shaft 32 also and, hence, with respect to sun gear 13.

The mechanical power branch 30 of the power split transmission shown in FIG. 1 is formed by a mechanical transmission shaft 32, on whose inlet side a sun gear 13 is fitted to, and on whose other side—the outlet side—power take-off shaft 3 is arranged. On transmission shaft 32 gear wheel 17 of gear set 6 is fitted to mesh with gear wheel 18 of the variable power branch 20. The transmission ratio of this mechanical power branch 30 of power split transmission 1 shows a fixed transmission ratio; here the transmission ratio value is equal to 1.

In the set-up of a power split transmission 1 according to the state of the art depicted in FIG. 1 the mechanical power branch 30 and the hydraulic power branch 20 of the transmission 1 are permanently connected with each other. The amount of power contributed by hydrostatic transmission 20 through output shaft 22 is variable, because hydrostatic pump 23 and hydrostatic motor 24 are of variable displacement that can be set by a control system, preferably an electronic control unit, for instance.

In the forward drive mode the embodiment depicted in FIG. 1 transmits the power flows conducted via the hydrostatic path 20 and the mechanical path 30 summed at gear set 6 completely to power take-off shaft 3. In this case shaft 18 of the mechanical power branch is driven by the planet wheel carrier 11 via the planets 14 and sun gear 13 in the forward rotational direction. Output shaft 22 thereby has to be driven in the other rotational direction, as the transmission ratio of gear set 6 is negative. If the embodiment depicted in FIG. 1 should be operated in the reverse drive mode, the rotational direction of power take-off shaft 3 has to be changed. This can be achieved only if the rotational direction of output shaft 22 of the hydrostatic power branch 20 is changed as the rotational direction of input shaft 2 is not change-able because it is driven by a combustion engine, for instance.

When changing the rotational direction of output shaft 22 in such a manner that power take-off shaft 3 rotates in the reverse direction, the rotational direction of mechanical transmission shaft 32 is changed to the reverse direction as well. This is due to the fix transmission ratio of gear set 6. This implies for the power split transmission 1 according to the state of the art, that on one hand the power available at power take-off shaft 3 in the reverse drive mode has to be provided solely via the hydrostatic power branch 20. Power generated by the hydrostatic power branch 20 is used here to drive the mechanical branch 30 as well, i.e. to drive the sun gear 13 within the planetary gear set 10. This in turn influences negatively the power available at power take-off shaft 3. Hence, sun gear 13 is driven in the reverse driving mode by the hydrostatic power branch 20 against the rotational direction of planet carrier 11. As it is the case for this power split transmission 1 that ring gear 12 is not driven directly, the preferred rotational direction of the sun gear 13 is the same rotational direction as for the planet carrier 11. In other words, in the forward driving mode the available power at power take-off shaft 3 is the sum of the power flows over the hydrostatic power branch 20 and over the mechanical power branch 30. In the reverse driving mode, however, the available power at power take-off shaft 3 is the power flow over the hydrostatic power branch 20 minus the power flow over the mechanical power branch 30.

Figure 2:
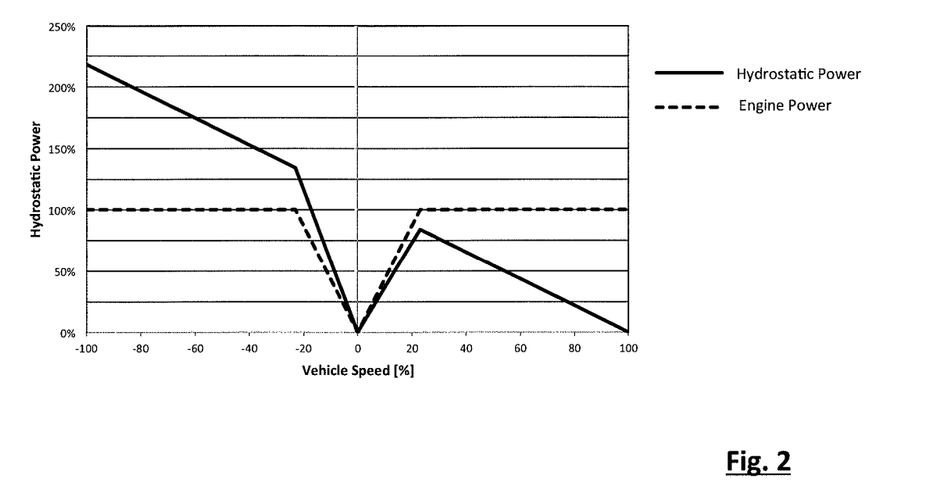
FIG. 2 shows by means of the prior art power split transmission of FIG. 1, a diagram of the proportion of power in the hydrostatic path in relation to the engine power and the vehicle speed.

FIG. 2 is a diagram showing the percentage of hydrostatic power needed to drive the power take-off shaft 3 with regard to the vehicle speed. Thereby, starting at zero speed, in the forward driving mode, the hydrostatic power initially increases with the engine power, until 100% of the engine power is reached. After this point with increasing vehicle speed the percentage of hydrostatic power decreases to zero when the maximum forward-speed of the vehicle is reached. Looking to the reverse driving mode, it can be seen that during the initial rise of engine power the increase of hydrostatic power is steeper than the one for the forward driving mode. This means, more hydrostatic power is needed to achieve the same speed in negative direction as the mechanical power branch 30 has to be driven by the hydrostatic power branch 20 as well. When 100% of engine power is reached and the vehicle speed should be increased further, the percentage of hydrostatic power continuous to rise, contrary to the forward driving mode. This is caused by the effect that in reverse driving mode the power for driving the vehicle (the power at power take-off shaft (3) is the power generated in the hydrostatic power branch 20 minus the re-circulating power through the mechanical power branch 30, which is increasing the power level in the hydrostatic power branch 20. Finally, at maximum reverse vehicle speed, the hydrostatic power has to be significantly higher than the power available at the power take-off shaft 3, as the other part is re-circulated through the mechanical branch 30 to the hydrostatic power branch 20.

In the following FIGS. 3 and 5 all reference numerals denoting similar constructive features will be retained.

Figure 3:
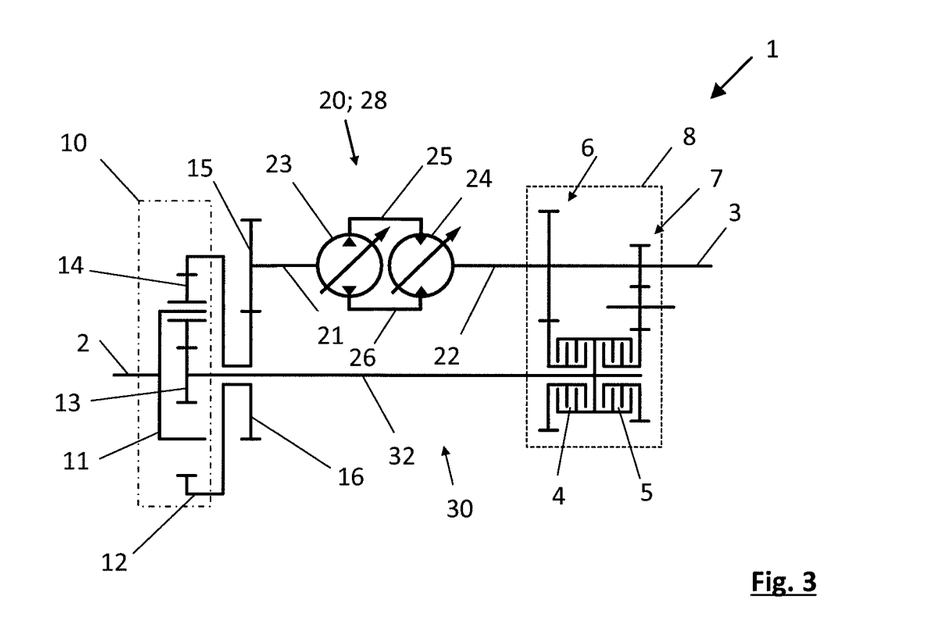
FIG. 3 is a first exemplary embodiment of a power split transmission according to the invention.

FIG. 3 shows an exemplary embodiment of a power split transmission 1 according to the invention. The features on the input side of power split transmission 1 are similar to those described with reference to the state of the art depicted in FIG. 1. On the output side of power split transmission 1, however, there is a reverser 8 acting as summation gear 9, having power input through output shaft 22 of hydrostatic transmission 20 and through mechanical transmission shaft 32 connected to planet gear set 10. The output of reverser 8 is given by means of a power take-off shaft 3. In reverser 8 a first clutch 4 and a second clutch 5 are arranged and assigned to a first gear set 6 and a second gear set 7, respectively. Closing first clutch 4 activates first gear set 6 such that the power flow over the mechanical power branch 30 can be summed to the power flow over the hydrostatic power branch 20 via the first gear set 6 in order to drive power take-off shaft 3. Closing second clutch 5 activates second gear set 7 such that the power flow over the mechanical branch 30 can be summed to the power flow over the hydrostatic power branch via the second gear set 7 in order to drive power take-off shaft 3 in the inverted rotational direction. Both, first gear set 6 and second gear set 7 are connected directly to power take-off shaft 3.

In the configuration of power split transmission 1 depicted in FIG. 3 power take-off shaft 3 is connected directly and permanently to output shaft 22 of hydrostatic transmission 28. Thus the hydrostatic power branch 20 of power split transmission 1 is always active. According to this embodiment of the invention it is possible to merge the output of the mechanical power branch 30 with the power provided by the hydrostatic transmission 28. A shaft 32 of the mechanical branch is driven directly by sun gear 13 of planetary gear set 10. If the hydrostatic power branch 20 is blocked, for instance by swivelling hydraulic pump 23 to maximum displacement, power take-off shaft 3 can be driven mechanically solely by first gear set 7 in the forward driving mode or via the second gear set 6 in the reverse driving mode (assumed input shaft 2 is driven in the forward driving mode). With both clutches 4 and 5 closed the vehicle can be hold in standstill even if input shaft 2 turns in idle speed, for example. At the same time the hydrostatic branch should be commanded to stand-still to not generate losses in the hydrostatic power branch 20.

If one assumes that input shaft 2 is rotated in the clockwise direction and that the clockwise rotational direction of power take-off shaft 3 is the rotational direction for the forward driving mode, then gear set 7 is used for the forward driving mode, as gear set 7 shows positive transmission ratio. This means that clutch 4 has to be open and clutch 5 has to be closed. This means further for the embodiment of FIG. 3 that output shaft 22 of the hydrostatic power branch 20 has to rotate in clockwise direction as well, such that power flow addition is possible. To reverse the rotational direction of power take-off shaft 3 by using both power branches the rotational direction of hydraulic motor 24 has to be changed, which usually is effected by swivelling the hydraulic pump unit 23 from positive displacement to negative displacement or vice versa. At the same time gear set 6 has to be engaged by opening clutch 5 and closing clutch 4. Now, in the reverse driving mode, in which power take-off shaft 3 turns counter-clockwise, output shaft 22 or the hydrostatic power branch 20 counter-rotates to mechanical transmission shaft 32 of the mechanical power branch 30.

Figure 4:
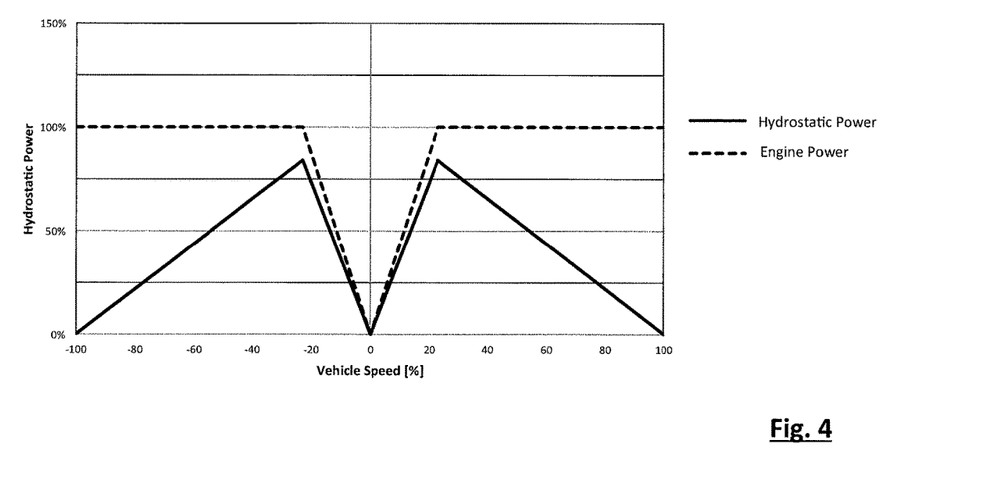
FIG. 4 shows by means of the power split transmission of FIG. 3, a diagram of the proportion of power in the hydrostatic path in relation to the engine power and the vehicle speed.

In FIG. 4 a diagram corresponding to the diagram of FIG. 2 is shown and depicts the improvement of operating conditions provided by the invention. Here it can be seen that for both driving modes, the forward and the reverse driving mode, the percentage of hydrostatic power rise with the increase of engine power, until 100% of engine power is reached. With increasing the vehicle speed further the percentage of applied hydrostatic power decreases until zero then maximum speed either in the forward direction or the reverse direction is reached. In this embodiment no hydrostatic power is recirculated and at maximum speed the vehicle is driven only by means of the mechanical power branch 30. At no time power loss due to re-circulation of hydrostatic power occurs.

Figure 5:
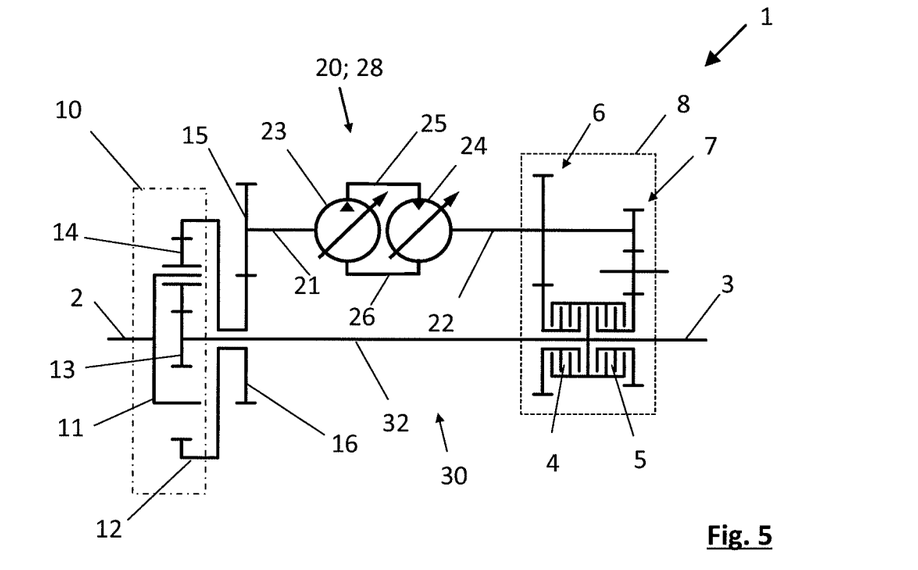
FIG. 5 is a second exemplary embodiment of the invention.

FIG. 5 depicts a modified embodiment of the invention. In this embodiment power take-off shaft 3 is located in extension of mechanical transmission shaft 32, i.e. it is part of the mechanical power branch 30. Here the rotational direction of power take-off shaft 3 can be selected by engaging first gear set 6 or by engaging second gear set 7, as both gear sets show opposite signs of transmission ratio. This provides the advantage that output shaft 22 of the hydrostatic power branch 20 must not be driven in both rotational directions. As the reverser 8 provides the possibility to merge the hydrostatic power in either rotational direction of the output shaft 22, only one rotational direction of the output shaft 22 of the hydrostatic power branch 20 is sufficient to drive power take-off shaft 3 either in the forward or the reverse driving mode. Here it is of no importance whether the output shaft 22 of the hydrostatic power branch 20 rotates clockwise or counter clockwise and the mechanical transmission shaft 32 of the mechanical branch 30 rotate in the forward driving mode clockwise or counter-clockwise. By means of the reverser a suitable positive or negative transmission ratio can be selected to merge the power flows of both power branches, i.e. of the hydrostatic power branch 20 and of the mechanical power branch 30.

Compared to the state-of-the-art implementation, the embodiment of FIG. 5 shows the benefit that the rotational direction in the variable power branch 20—here the hydrostatic transmission 30—can be designed unidirectional. By means of using reverser 8 for merging the power flows over the power branches 20 and 30 the rotational direction can be changed to either rotational direction at the power take-off shaft 3. By alternatively engaging first gear set 6 or second gear set 7 by means of first clutch 4 or second clutch 5, respectively, the rotational direction of power take-off shaft 3 can be changed to the desired rotational direction, for instance set by a machine operator. Thereby the rotational direction of output shaft 22 of the variable power branch remains always the same. Hence, the variable transmission used in the variable power branch 20 can be of simpler design, because it does not have to provide power in both rotational directions. This also saves construction space, for instance when using a hydrostatic transmission 30, as shown in FIG. 5. Here, hydrostatic pump 23 is only capable to swivel in one direction, i.e. from zero displacement to a single maximum displacement.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A power split transmission comprising:
   a power input shaft for driving a planetary gear set splitting the input power at power input shaft into a power flow over a variable power branch having a variable transmission ratio and into a power flow over a mechanical power branch having a fixed transmission ratio,
   a summation gear box configured to merge the power flows transmitted over the variable power branch and the mechanical power branch for driving a power take-off shaft,
   wherein the summation gear box is a reverser comprising a first clutch configured to couple and decouple a first gear set with the power take-off shaft, and a second clutch configured to couple and decouple a second gear set with the power take-off shaft,
   wherein the first gear set establishes a negative transmission ratio and the second gear set establishes a positive transmission ratio, such that the power flows over the variable power branch and the mechanical power branch are merged either by engaging the first clutch and disengaging the second clutch,
   if an output shaft of the variable power branch counter-rotates with respect to a mechanical transmission shaft of the mechanical power branch, or
   by disengaging the first clutch and engaging the second clutch, if the output shaft of the variable power branch co-rotates with respect to the mechanical transmission shaft of the mechanical power branch.

2. The power split transmission according to claim 1, wherein the output shaft of the variable power branch or an output shaft of the mechanical power branch can be used as the power take-off shaft.

3. The power split transmission according to claim 1, wherein the first clutch is a jaw clutch, a synchronized jaw clutch or a friction clutch and the second clutch is a jaw clutch, a synchronized jaw clutch or a friction clutch.

4. The power split transmission according to claim 1, wherein the power input shaft can be connected to a planet wheel carrier of the planetary gear set, the variable power branch is driveable by a ring gear and the mechanical power branch is driveable by a sun gear.

5. The power split transmission according to claim 1, wherein the variable power branch is a hydrostatic transmission comprising a variable displacement hydrostatic pump and a constant or variable displacement hydrostatic motor.

6. The power split transmission according to claim 5, wherein the variable displacement hydraulic motor or the variable displacement hydrostatic pump or both are of a bent-axis type.

7. A method of merging the power flows of a power split transmission, whereas a power input shaft drives a planetary gear set splitting the input power into a power flow over a variable power branch and into a powerflow over a mechanical power branch, wherein the power flow transmitted over the variable power branch can be merged again with the power flow over the mechanical power branch for driving a power take-off shaft, wherein a reverser comprising a first clutch, a second clutch, a first gear set and a second gear set is used for merging the power flows and for driving the power take-off shaft, thereby
   engaging the first clutch and disengaging the second clutch, if an output shaft of the variable power branch and a mechanical transmission shaft are counter-rotating, thereby driving the first gear set; and
   engaging the second clutch and disengaging the first clutch, if the output shaft of the variable power branch and the mechanical transmission shaft are co-rotating, thereby driving the second gear set, whose transmission ratio is opposite to the transmission ratio of the first gear set.

8. The method for operation of a power split transmission according to claim 7, wherein, if the output shaft of the variable power branch is used as power take-off shaft, the reverse driving mode of the power split transmission is set by reversing the rotational direction of the output shaft and adapting the open or closed states of the first clutch and the second clutch considering that the rotational direction in the mechanical power branch is the same for the forward driving mode and the reverse driving mode.

9. The method for operation of a power split transmission according to claim 7, wherein, if the mechanical transmission shaft of the mechanical power branch is used as power take-off shaft, the reverse driving mode of the power split transmission is set by engaging the second clutch to merge the power flows via the second gear set considering that the rotational direction in the variable power branch is the same for the forward driving mode and the reverse driving mode.

10. The method for operation of a power split transmission according to claim 9, wherein, if the mechanical transmission shaft of the mechanical power branch is used as power take-off shaft, both clutches are disengaged and the variable power branch is blocked for driving the power split transmission mechanically at maximum speed.

11. The method for operation of a power split transmission according to claim 8, wherein the variable power branch comprises a hydrostatic transmission, whose hydrostatic pump unit is stroked to maximum displacement and whose hydrostatic motor unit is stroked to zero displacement for blocking the power split transmission.

12. The method for operation of a power split transmission according to claim 7, wherein the power split transmission is blocked by engaging both clutches.

13. The power split transmission according to claim 2, wherein the first clutch is a jaw clutch, a synchronized jaw clutch or a friction clutch and the second clutch is a jaw clutch, a synchronized jaw clutch or a friction clutch.

14. The power split transmission according to claim 2, wherein the power input shaft can be connected to a planet wheel carrier of the planetary gear set, the variable power branch is driveable by a ring gear and the mechanical power branch is driveable by a sun gear.

15. The power split transmission according to claim 3, wherein the power input shaft can be connected to a planet wheel carrier of the planetary gear set, the variable power branch is driveable by a ring gear and the mechanical power branch is driveable by a sun gear.

16. The power split transmission according to claim 2, wherein the variable power branch is a hydrostatic transmission comprising a variable displacement hydrostatic pump and a constant or variable displacement hydrostatic motor.

17. The power split transmission according to claim 3, wherein the variable power branch is a hydrostatic transmission comprising a variable displacement hydrostatic pump and a constant or variable displacement hydrostatic motor.

18. The power split transmission according to claim 4, wherein the variable power branch is a hydrostatic transmission comprising a variable displacement hydrostatic pump and a constant or variable displacement hydrostatic motor.

19. The method for operation of a power split transmission according to claim 8, wherein the power split transmission is blocked by engaging both clutches.

20. The method for operation of a power split transmission according to claim 9, wherein the power split transmission is blocked by engaging both clutches.

* * * * *